United States Patent [19]

Scheidler

[11] 4,114,082

[45] Sep. 12, 1978

[54] DUAL VOLTAGE BATTERY SYSTEM AND ELECTRONIC SWITCH THEREFOR

[76] Inventor: Ralph E. Scheidler, 7415 SE. Johnson Creek Blvd., Portland, Oreg. 97206

[21] Appl. No.: 812,441

[22] Filed: Jul. 5, 1977

[51] Int. Cl.² .............................................. H02J 7/04
[52] U.S. Cl. .......................................... 320/7; 320/16; 320/57
[58] Field of Search ................................ 320/2, 5–7, 320/15, 16, 57; 323/15

[56] References Cited

U.S. PATENT DOCUMENTS

| | | | |
|---|---|---|---|
| 3,286,152 | 11/1966 | Noe | 320/7 |
| 3,763,415 | 10/1973 | Ownby | 320/16 X |
| 3,871,383 | 3/1975 | Lee | 323/15 X |

Primary Examiner—Robert J. Hickey
Attorney, Agent, or Firm—Oliver D. Olson

[57] ABSTRACT

A pair of batteries of equal voltage rating are connected together in parallel through isolation diodes and in series through a first silicon controlled rectifier, the gate electrode of which is connected to the positive terminal of the first battery through a second silicon controlled rectifier and the emitter-collector switch circuit of a switching transistor. The gate electrode of the second silicon controlled rectifier is connected to said positive terminal through a capacitor and said transistor switch. The base-emitter switch actuator circuit of the switching transistor is connected across the first battery in a manner to maintain the transistor normally activated, whereby the impulse generated from the instantaneous voltage drop across said first battery, upon energization of an electric load connected thereto, is applied through said transistor switch to the gate electrode of the second silicon controlled rectifier, activating the latter to supply power to the gate electrode of the first silicon controlled rectifier, thereby turning the latter on and connecting the pair of batteries together in series. Conductors connected across the first silicon controlled rectifier are arranged for connection to the output terminals of a conventional battery charging source, rated for charging one of the pair of batteries, the isolation diodes maintaining the batteries in parallel during charging.

16 Claims, 1 Drawing Figure

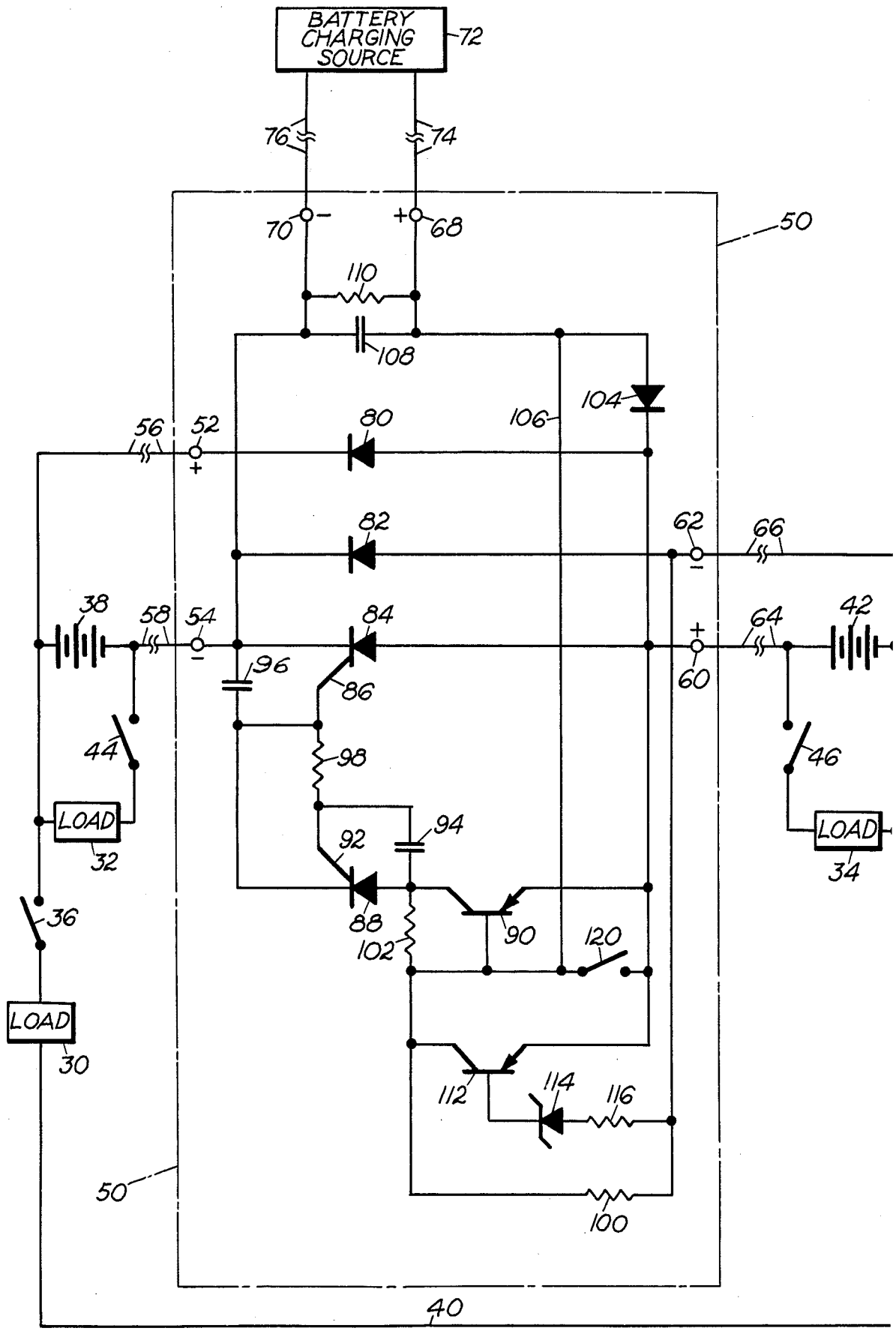

DUAL VOLTAGE BATTERY SYSTEM AND ELECTRONIC SWITCH THEREFOR

BACKGROUND OF THE INVENTION

This invention relates to dual voltage battery systems, and more particularly to an electric switch by which to enable selection between such dual voltage outputs and also to maintain the batteries in parallel for charging from a conventional charging voltage source.

Dual voltage electrical systems are finding increased applications. Typical of these is the use of a 12/24 volt electric trolling motor, as in bass boats, wherein the boat is also provided with an internal combustion engine as the main drive source, the engine having a 12 volt electrical system and a 12 volt engine-driven alternator or generator.

Heretofore, such a dual voltage electrical system utilized one of the batteries only for the 12 volt demand, and both batteries connected together in series for the 24 volt demand. Since the 12 volt demand battery delivers more ampere-hours than the other battery of the pair, the batteries require different charging rates. However, this cannot be accommodated with the batteries connected in series, since one battery would overcharge and the other would undercharge.

Accordingly, it has been the practice heretofore to disconnect the batteries from their series arrangement and reconnect them for parallel charging by a conventional 12 volt charging source. This is a time consuming procedure, and a particularly annoying one to fishermen who have tired from the strenuous activities of the fishing day. Moreover, since such reconnections often must be made under poor lighting conditions prevailing at dockside, inadvertent errors may result in electrical shorting or arcing that can cause explosion of or other damage to the batteries. A series-parallel arranged toggle switch has been utilized for manual switching in an attempt to overcome the problems associated with the reconnection procedure discussed hereinbefore. However, such a switch results in violation of basic battery charging principles and thus is unsatisfactory.

SUMMARY OF THE INVENTION

In its basic concept, this invention provides a dual voltage battery system and electronic switch therefor, by which a pair of batteries of equal voltage rating are connected together in parallel through isolation rectifiers and in series through an electronic switch which is controlled by an impulse generated from the instantaneous voltage drop across the first battery of the pair. A conventional battery charging source, rated for charging one of the pair of batteries, is connectable across the electronic switch, the isolation rectifiers maintaining the batteries in parallel during charging.

It is by virtue of the foregoing basic concept that the principal objective of this invention is achieved; namely, to overcome the aforementioned disadvantages and limitations of prior dual voltage battery systems.

Another important object of this invention is the provision of a dual voltage battery system and switch therefor which accommodates use of a pair of batteries selectively in parallel or in series and affords charging while the batteries are maintained in parallel, all without requiring rearrangement of electrical wiring.

A specific objective of this invention is the provision of a dual voltage battery system and switch therefor for use with a vehicle-towed boat having a dual voltage electric trolling motor and a primary drive engine having the same DC generator or alternator and electrical system as the vehicle, wherein the system and switch may supply the appropriate electric potential to all electrical loads and the batteries may be charged either from the alternator or generator of the towing vehicle or boat drive engine, or from a conventional battery charger supplied from a common source of household alternating current.

A further objective of this invention is the provision, for a dual voltage battery system, of an electronic switch of simplified construction for economical manufacture and rugged design for long and faithful service under severe conditions of usage.

The foregoing and other objects and advantages of this invention will appear from the following detailed description, taken in connection with the accompanying drawing of a preferred embodiment.

BRIEF DESCRIPTION OF THE DRAWING

The single FIGURE is a schematic electrical diagram of a dual voltage battery system and electronic switch therefor, embodying the features of this invention.

DESCRIPTION OF THE PREFERRED EMBODIMENT

For purposes merely of illustration, the drawing illustrates a dual voltage battery system particularly suited for use with a bass boat equipped with a 12/24 volt electric trolling motor, represented by the load 30, an internal combustion main drive engine having a 12 volt electric load 32 which may include the electric starting system and diverse accessories such as running lights, navigation instruments and others. A third 12 volt load 34 also is illustrated. It may be the 12 volt sections of the dual voltage trolling motor, or it may be some other specialized load.

As illustrated, one terminal of the load 30 is connected through the main control switch 36 to the positive terminal of battery 38, hereinafter referred to as the second battery. The other terminal of the load is connected through a conductor 40 to the negative terminal of the first battery 42 of the pair, hereinafter referred to as the first battery. The 12 volt load 32 is connected through a control switch 44 across the second battery 38, and the other 12 volt load is connected through a control switch 46 across the first battery 42.

It will be understood from the foregoing that the positive terminals of both batteries provide a given output voltage when the batteries are connected together in parallel and that when connected together in series the output voltage at the positive terminal of the second battery 38 for load 30 is twice the output voltage at the positive terminal of the first battery 42.

Associated with the foregoing components of the dual voltage battery system is an electronic switch component of this invention. As illustrated, the elements of the switch are contained within a housing illustrated by the broken line 50. The housing supports a first pair of electrical connectors 52 and 54 which are arranged to be connected to the positive and negative terminals of the second battery 38, as by means of appropriately elongated flexible conductors 56 and 58; a second pair of electrical conductors 60 and 62 arranged to be connected to the positive and negative terminals of the first battery 42, as by means of appropriately elongated flexible conductors 64 and 66; and a third pair of electrical connectors 68 and 70 arranged to be connected to the positive and negative output terminals of a conventional battery charging source 72, as by means of appropriately elongated flexible conductors 74 and 76.

It is an important feature of this invention that the battery charging source 72 may be the DC alternator or generator of the boat-towing vehicle, or the DC generator or alternator driven by the boat engine, or a battery charger supplied from a common source of household alternating current. In all instances, the charging source is of the commercially available type rated for charging one of the pair of batteries.

The positive connectors 52 and 60 of the first and second pair of connectors are interconnected by a rectifier 80, illustrated in the drawing as an isolation diode. Similarly, the isolation diode 82 interconnects the negative connectors 54 and 62 of the first and second pair of connectors. Diode 80 is oriented in polarity to block from the first battery 42 the higher voltage of the second battery 38 when the pair of batteries are connected together in series. Diode 82 is oriented in polarity to isolate the positive terminal of the first battery from the negative terminal of the first battery to prevent shorting when the batteries are connected in series.

The negative connector 54 of the first pair of connectors is connected to the positive connector 60 of the second pair through an electrically actuated switch, the actuator of which includes an electric circuit which is connected to the first battery for actuation as a result of the instantaneous voltage drop across said first battery upon energization of an electric load connected thereto.

In the embodiment illustrated, the electrically actuated switch is provided by a silicon controlled rectifier 84. The switch actuator includes the gate electrode 86 of the silicon controlled rectifier, and it is included in an electric circuit which is connected to the positive connector 60 of the second pair of connectors. Thus, the gate electrode is connected through a second silicon controlled rectifier 88 and the emitter-collector switch circuit of a switching transistor 90 to said positive connector 60. The gate electrode 92 of the second silicon controlled rectifier is connected capacitively, through the capacitor 94, to the emitter-collector switch circuit of the switching transistor 90.

The capacitor 96 provides a noise path to prevent premature turn-on of the first silicon controlled rectifier 84, and resistor 98 is the gate to cathode resistance.

The base of switching transistor 90 is connected through a resistor 100 to the negative connector 62 of the second pair of connectors. Resistor 102 interconnects the collector and base of the switching transistor 90 and cooperates with resistor 100 to maintain the switching transistor normally "on." Thus, the base-emitter circuit of the transistor is connected across the first battery 42 in a manner to maintain the transistor activated and the emitter-collector switch thereof normally closed.

A rectifier 104, in the form of a diode, interconnects the positive connector 60 of the second pair of connectors and the positive connector 68 of the third pair of connectors. Its purpose is to protect against prematuve activation of the first silicon controlled rectifier 84 by the direct current output of a battery charging source. The diode will not conduct until it has reached a predetermined threshhold voltage provided by the charger. However, a conductor 106 directly interconnects the positive connector 68 of the third pair and the base of the switching transistor 90. Accordingly, before the charger 72 reaches the threshhold voltage which enables the diode 104 to conduct, that voltage is applied to the base of the switching transistor 90, causing the latter to be turned off. Thus, by the time the diode 104 conducts the switching transistor has been turned off, thereby preventing activation of the first silicon control rectifier 84.

Means is provided to prevent premature activation of the first silicon controlled rectifier 84 which may result from the use of long conductors 74 and 76 interconnecting the third pair of connectors and a DC generator or alternator on a towing vehicle. This may be caused by electrical impulses resulting from vibrations and jolting of the equipment during travel. For this purpose a capacitor 108 is connected across the third pair of connectors 68 and 70, to smooth out such electrical impulses. When the battery charging begins, capacitor 108 charges instantly and insures continuous voltage at the base of transistor 90 to maintain the latter off at all times until the charger is completely turned off. A resistor 110 is connected across the capacitor to effect discharge of the latter in sufficient time to allow normal operation of the electric loads, for example after the boat has been put in the water.

Means also is provided to prevent premature activation of the first silicon control rectifier as a result of the development of voltages above a predetermined maximum, as when a DC generator or alternator has an output current higher than a predetermined maximum. For this purpose the emitter-collector switch circuit of a second switching transistor 112 interconnects the base of the first switching transistor 90 and the positive connector 60 of the second pair of connectors. The base of the second switching transistor is connected through a zener diode 114 and a resistor 116 to the negative connector 62 of the second pair.

Thus, so long as the voltage remains below a predetermined value, the zener diode will not fire to turn on the second switching transistor. However, if the voltage exceeds the predetermined value, the zener diode fires, turning on the second switching transistor which results in deactivation of the first switching transistor and consequent deactivation of the first silicon controlled rectifier.

Under this condition, wherein the battery charging source is a DC alternator or generator which provides an output current higher than the predetermined value referred to hereinbefore, it is preferred that the diode 104 be bypassed by connecting the positive connector 68 of the third pair directly to the positive connector 60 of the second pair.

In the event the load 30 is a conventional 12/24 volt electric trolling motor, the selection of operation between 12 voltage and 24 volts may be made by the internal manual switching control provided with the motor, as will be understood. On the other hand, means preferably is provided for limiting the voltage to the motor to the lower value of 12 volts. For this purpose a manually controlled switch 120 releasably interconnects the base of the first switching transistor 90 and the positive connector 60 of the second pair. Accordingly, with this switch closed, the first switching transistor is turned off and the first silicon controlled rectifier 84 is deactivated, preventing connection of the batteries together in series and thus limiting the voltage to the load 30 to 12 volts.

The operation of the dual voltage battery system described hereinbefore is as follows: Let it be assumed that the system is utilized in a bass boat wherein the load 30 is a 12/24 volt electric trolling motor, the load 32 is the electrical starting system of the internal combustion engine of the boat, which engine drives a 12 volt alternator, and the load 34 is a 12 volt accessory circuit of the boat.

With the boat in the water, the main drive engine and accessories of the boat are activated by closing the switches 44 and 46, whereupon the boat may be driven rapidly to a desired fishing site. The boat engine then may be shut off by opening the switch 44. Alternatively, the drive engine may remain running in order to provide charging of the batteries so long as the electric trolling motor is operated at the lower speed provided by the 12 volt power supply. This mode of operation may be insured by closing the switch 120 and thereby prevent activation of the first silicon controlled rectifier 84 and connection of the batteries together in series.

If it is desired to operate the trolling motor at the higher speed provided by the 24 volt supply, the main drive engine of the boat is deactivated by opening the switch 44. In addition, the switch 120 also is opened to allow first switching transistor 90 to be activated to its normally "on" condition. Then, upon closure of the switch 36 associated with the 12/24 volt motor, the impulse generated from the instantaneous voltage drop across the first battery 42 is applied through the emitter-collector circuit of the activated first switching transistor 90, through the capacitor 94 to the gate electrode 92 of the second silicon controlled rectifier. The latter thereupon is activated to supply power to the gate electrode 86 of the first silicon controlled rectifier, whereupon the latter is energized, connecting the pair of batteries together in series, supplying 24 volts to the trolling motor.

It is to be noted that, in the series connected arrangement, the diode rectifier 80 blocks the 24 volts at the positive terminal of the second battery 38 from the positive terminal of the first battery 42, and that the diode rectifier 82 isolates the positive and negative terminals of the first battery from each other.

During operation of the 24 volt trolling motor, the first silicon controlled rectifier 84 is latched on from the current of the motor, and it remains on until the motor is turned off. Loss of motor current results in the silicon controlled rectifier being deactivated, whereupon the batteries are returned to the parallel connected condition.

Let it now be assumed that, upon completion of the fishing trip the boat is loaded onto a trailer for transport to its place of storage. The batteries may be recharged by use of the DC generator or alternator associated with the towing vehicle, by connecting the output of the generator or alternator through elongated conductors 74 and 76 to the third pair of connectors 68 and 70. The charging circuit for the first battery 42 extends from the positive connector 68 through the diode 104, thence through the battery and the isolation diode 82 to the negative connector 70. The charging circuit for the second battery 38 extends from the positive connector 68 through the diode 104 and the isolation diode 80, thence through the battery to the negative connector 70. Accordingly, it is apparent that both batteries are connected in parallel for simultaneous charging from a conventional 12 volt charging source 72.

In the event a transient impulse appears at the positive connector 68, as a result of vibration or other jostling as the equipment travels along the road, which impulse exceeds a predetermined value, the zener diode 114 fires and turns on the second switching transistor 112, thereby turning off the first switching transistor 90 and preventing activation of the first silicon controlled rectifier 84, as previously described.

In the event it is determined that the DC alternator associated with the towing vehicle provides an output charging current greater than a predetermined value, the elongated conductor 74, normally connected to the positive connector 68 of the third pair of connectors, is connected directly to the positive connector 60 of the second pair, thereby bypassing the diode 104 to protect it from possible damage. The higher charging voltage turns on the zener diode 114 and the associated second switching transistor thereby turning off the first switching transistor and preventing activation of the first silicon controlled rectifier, as before.

The same charging mode is achieved by use of the DC generator or alternator associated with the prime drive engine of the boat, as will be understood.

Alternatively, let it be assumed that instead of transporting the boat by trailer, it is moored at a dock and the source of charging voltage for the batteries is supplied by a conventional 12 volt battery charger connected to a conventional source of 110 volt alternating current at dockside. If the charger is of the inexpensive type in which the pulsating direct current output is of sufficient magnitude to cause activation of the first silicon controlled rectifier, the diode 104 protects against such action by delaying its conduction until the first switching transistor 90 has been turned off, and capacitor 108 insures that the first switching transistor remains off until the charger has been turned off, as described hereinbefore.

From the foregoing, it will be appreciated that the present invention provides a dual voltage battery system and electronic switch therefor which enables the controlled application of dual voltages to appropriate loads while also facilitating the charging of both batteries from a conventional charging source, without the necessity of disconnecting and reconnecting conductors, as previously required. The batteries are maintained in parallel during charging, and the charging may be provided by any of a variety of conventional charging sources, such as engine driven DC alternators or generators, or conventional inexpensive alternating current type chargers supplied from a conventional source of 110 volt alternating current. The electronic switch components of the system is self-contained and may be integrated into a diversity of electric systems utilizing a pair of batteries for deriving dual voltages. Thus, in addition to use in bass boats as previously mentioned, the system and switch may be used in other types of boats, in golf carts, lift trucks and many other applications. The switch is of simplified construction for economical manufacture and is of rugged design for severe usage.

It will be apparent to those skilled in the art that various changes may be made in the size, shape, type, number and arrangement of parts described hereinbefore. For example, the pair of batteries are shown to be single batteries, whereas it will be understood that each may be composed of several batteries connected together in parallel or series banks, it being required that they be isolated one from another and be of the same voltage rating. Thus, whereas the batteries illustrated are 12 volt batteries, the utimate pair of batteries may provide other dual output voltages, such as 6/12; 8/16; 18/36; etc. The batteries may be reversed in polarity from the arrangement illustrated, by appropriate changes in the arrangement of circuit components, as will be understood. The foregoing and other modifications and changes may be made, as desired, without departing from the spirit of this invention.

Having now described my invention and the manner in which it may be used, I claim:

1. A dual voltage battery system, comprising:
   (a) first and second batteries of equal voltage rating,
   (b) first rectifier means interconnecting the positive terminals of the batteries,
   (c) second rectifier means interconnecting the negative terminals of the batteries,
   (d) first electrically actuated switch means releasably interconnecting one terminal of the first battery and the opposite polarity terminal of the second battery for connecting the batteries together in series,
   (e) first switch actuator means having an electric circuit connected to the first battery and operable by an impulse generated from an instantaneous voltage drop across said battery by connection of a load thereacross to activate the first switch means to connect the batteries together in series,
   (f) one of the rectifier means being arranged to block the higher voltage output of the second battery of the series from the first battery, and the other rectifier means being arranged to isolate the positive and negative terminals of the first battery from each other, and
   (g) electrical conductors connected across the first switch means and arranged for connection to the positive and negative output terminals of a source of battery charging voltage rated for charging one of said batteries.

2. The dual voltage battery system of claim 1 including voltage control switch means for deactivating the first electrically actuated switch means for preventing connection of the batteries in series.

3. The dual voltage battery system of claim 1 wherein the first switch means is a first silicon controlled rectifier, and the first switch actuator means includes the gate electrode of the first silicon controlled rectifier connected to the said one terminal of the first battery through the series circuit arrangement of a second silicon controlled rectifier and a second electrically actuated switch means, the gate electrode of the second silicon controlled rectifier being connected capacitively to the said one terminal of the first battery through said second electrically actuated switch means, and second switch actuator means connected to the first battery for maintaining the second switch means normally closed.

4. The dual voltage battery system of claim 3 wherein the second switch means comprises the emitter-collector circuit of a switching transistor, and the second switch actuator means comprises the base-emitter circuit of said switching transistor.

5. The dual voltage battery system of claim 4 including voltage control switch means for deactivating the first electrically actuated switch means for preventing connection of the batteries in series, the voltage control switch means comprising a manually operated switch releasably connecting the base of the switching transistor to the said one terminal of the first battery.

6. The dual voltage battery system to claim 3 including rectifier means connecting the corresponding electrical battery charging conductor to the said one terminal of the first battery, and an electrical conductor connecting the said corresponding electrical battery charging conductor to the base of the switching transistor.

7. The dual voltage battery system of claim 3 including third electrically actuated switch means in the base-emitter circuit of the switching transistor for controlling activation of the latter, and third switch actuator means connected to the first battery and operable at a predetermined maximum charging voltage to actuate the third switch means to deactivate the switching transistor.

8. The dual voltage battery system of claim 7 wherein the third electrically actuated switch means comprises the emitter-collector circuit of the second switching transistor, and the third switch actuator means comprises the base-emitter circuit of the second switching transistor connected in series with a zener diode across the first battery.

9. A dual voltage switch for connecting a pair of batteries of equal voltage rating selectively in series and in parallel for supplying dual voltages and for connecting the pair of batteries in parallel for charging from a conventional source of charging voltage, the switch comprising:
   (a) first positive and negative connectors arranged for connection of the positive and negative terminals respectively of a first battery,
   (b) second positive and negative connectors arranged for connection of the positive and negative terminals respectively of a second battery,
   (c) first rectifier means interconnecting the first and second positive connectors,
   (d) second rectifier means interconnecting the first and second negative connectors,
   (e) first electrically actuated switch means releasably interconnecting one of the connectors of the first pair of connectors and the opposite polarity connector of the second pair of connectors for releasably interconnecting a pair of batteries in series,
   (f) first switch actuator means having an electric circuit connected to the said one connector of the first pair of connectors and operable by an impulse generated from the instantaneous voltage drop across a battery connected thereto by connection of a load thereacross to activate the first switch means to connect the pair of batteries togther in series,
   (g) one of the rectifier means being arranged to block the higher voltage at one connector of the second pair of connectors from the corresponding polarity connector of the first pair of connectors when the first switch means is activated, and the other rectifier means being arranged to isolate the first positive and negative connectors from each other,
   (h) third positive and negative connectors arranged for connection of the positive and negative terminals of a source of battery charging voltage rated for charging one of said batteries, and
   (i) electrical conductors connecting the third positive and negative connectors across the first switch means.

10. The dual voltage switch of claim 9 including voltage control switch means for deactivating the first electrically actuated switch means for preventing connection of the pair of batteries in series.

11. The dual voltage switch of claim 9 wherein the first switch means is a first silicon controlled rectifier, and the first switch actuator means includes the gate electrode of the first silicon controlled rectifier connected to the said one connector of the first pair of connectors through the series circuit arrangement of a second silicon controlled rectifier and a second electrically actuated switch means, the gate electrode of the second silicon controlled rectifier being connected capacitively to the said one connector of the first pair of connectors through said second electrically actuated switch means, and second switch actuator means connected to the first connectors for maintaining the second switch means normally closed.

12. The dual voltage switch of claim 11 wherein the second switch means comprises the emitter-collector circuit of a switching transistor, and the second switch actuator means comprises the base-emitter circuit of said switching transistor.

13. The dual voltage switch of claim 12 including voltage control switch means for deactivating the first electrically actuated switch means for preventing connection of the pair of batteries in series, the voltage control switch means comprising a manually operated switch releasably connecting the base of the switching transistor to the said one connector of the first pair of connectors.

14. The dual voltage switch of claim 11 including rectifier means interconnecting the said one connector of the first pair of connectors and the corresponding polarity connector of the third pair of connectors, and an electrical conductor connecting the base of the switching transistor to the said corresponding connector of the third pair of connectors.

15. The dual voltage switch of claim 11 including third electrically actuated switch means in the base-emitter circuit of the switching transistor for controlling activation of the latter, and third switch actuator means connected to the said first connectors and operable at a predetermined maximum charging voltage to actuate the third switch means to deactivate the switching transistor.

16. The dual voltage switch of claim 15 wherein the third electrically actuated switch means comprises the emitter-collector circuit of a second switching transistor, and the third switch actuator means comprises the base-emitter circuit of the second switching transistor connected in series with a zener diode across the first connectors.

* * * * *